(12) United States Patent
Grubb et al.

(10) Patent No.: US 6,297,903 B1
(45) Date of Patent: *Oct. 2, 2001

(54) MULTIPLE STAGE OPTICAL FIBER AMPLIFIER AND SIGNAL GENERATOR

(75) Inventors: Stephen G. Grubb, Fremont; Bernard G. Fidric, Cupertino, both of CA (US)

(73) Assignee: SDL, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/441,103

(22) Filed: Nov. 16, 1999

(51) Int. Cl.[7] .................................................. H01S 3/091
(52) U.S. Cl. ........................................ 359/341.3; 359/337
(58) Field of Search .................................. 359/333, 341, 359/337

(56) References Cited

U.S. PATENT DOCUMENTS

| | | | | |
|---|---|---|---|---|
| 5,185,826 | * | 2/1993 | Delavaux | 385/24 |
| 5,233,463 | * | 8/1993 | Grasso et al. | 359/341 |
| 5,430,572 | * | 7/1995 | Digiovanni et al. | 359/341 |
| 5,521,753 | * | 5/1996 | Fake et al. | 359/341 |
| 5,995,275 | * | 11/1999 | Sugaya | 359/341 |
| 6,008,933 | * | 12/1999 | Grubb et al. | 359/341 |
| 6,011,644 | * | 1/2000 | Button et al. | 359/341 |
| 6,028,698 | * | 2/2000 | Ogoshi et al. | 359/341 |

FOREIGN PATENT DOCUMENTS

2000114631-A * 4/2000 (JP) ................... H01S/3/06

* cited by examiner

*Primary Examiner*—Thomas H. Tarcza
*Assistant Examiner*—Deandea Hughes
(74) *Attorney, Agent, or Firm*—Kudirka & Jobse, LLP

(57) ABSTRACT

An optical amplifier makes use of a co-propagating fiber amplifier stage and a counter propagating fiber amplifier stage. One of the stages is preferably a low noise stage, while the other is a high gain stage, typically the output stage. The low noise stage may have a small core fiber while the high gain stage has a large core fiber. Pumping energy is introduced into the amplifier by coupling a plurality of laser sources in the same wavelength range using a narrow channel wavelength division multiplexer coupler. In each stage of the amplifier, some portion of the pump energy is transferred from the pumping wavelength to the signal wavelength. In a single polarization optical signal generator embodiment, the optical signal is developed in a distributed Bragg reflector oscillator having an output Bragg grating embedded in a polarization perserving fiber. A polarization controller is used at the amplifier output to restore the single polarization which is developed in the oscillator.

44 Claims, 4 Drawing Sheets

MULTIPLE STAGE OPTICAL FIBER AMPLIFIER AND SIGNAL GENERATOR

FIELD OF THE INVENTION

This invention relates to the field of optical signal processing and, more particularly, to the amplification of an optical signal using an optical fiber amplifier.

BACKGROUND OF THE INVENTION

As is known in the art, an optical amplifier is a device that increases the amplitude of an input optical signal fed thereto. If the optical signal at the input to such an amplifier is monochromatic, the output will also be monochromatic, with the same frequency. A conventional fiber amplifier comprises a gain medium, such as a single mode glass fiber having a core doped with a rare earth material, connected to a WDM coupler which provides low insertion loss at both the input signal and pump wavelengths. The input signal is provided, via the coupler, to the medium. Excitation occurs through optical pumping from the pumping source. The pump energy which is within the absorption band of the rare earth dopant is combined with the optical input signal within the coupler and applied to the medium, and an amplified output signal is emitted from the other end of the fiber.

Such amplifiers are typically used in a variety of applications including, but not limited to, amplification of weak optical pulses such as those that have traveled through a long length of optical fiber in communication systems. Optical amplification can take place in a variety of materials including those materials, such as silica, from which optical fibers are formed.

One type of fiber amplifier referred to as an erbium doped fiber amplifier (EDFA) typically includes a silica fiber having a single-mode core doped with erbium (specifically doped with erbium ions conventionally denoted as $Er^{3+}$). It is well known that an EDFA operating in its standard so-called three level mode is capable, when pumped at a wavelength of 980 nanometers (nm), of amplifying optical signals having a wavelength of approximately 1550 nm. Since 1550 nm is the lowest loss wavelength of conventional single-mode glass fibers, erbium amplifiers are well suited for inclusion in fiber systems that propagate optical signals having wavelengths around 1550 nm.

For many communications applications, particularly those involving the use of digital signal transmission, it is necessary to use polarized optical signals. Modulators used for digital signal modulation use changing signal polarization to control the generation of digital pulse, and are therefore polarization dependent. Thus, it is necessary to have polarized optical energy to ensure that the desired signal modulation is accomplished. Using optical signal energy with a known, controlled polarization is therefore highly desirable for optical signal communication applications.

It has been an ongoing pursuit in the field of optical amplifiers to increase the power output of the amplifiers and/or reduce the noise figure (i.e., the additional noise introduced into the input signal by the amplifier itself). It is therefore an object of this invention to provide an optical amplifier having better performance in output power and relative noise than those demonstrated in the prior art.

SUMMARY OF THE INVENTION

In accordance with the present invention, a multiple stage optical amplifier includes a co-propagating fiber amplifier stage (in which the pump energy and signal energy propagate in the same direction), and a counter-propagating amplifier stage (in which the pump energy and signal energy propagate in opposite directions). In a preferred embodiment, the optical signal is coupled into a first amplifier stage along with the pump energy using, for example, a wavelength division multiplexer (WDM). The pump energy may consist of a combination of energy from a plurality of lasers all close in wavelength, the outputs of which are combined using a narrow channel WDM coupler. Typically, the first amplifier stage has a fiber coil doped with rare earth material and is configured to have relatively low noise. To minimize the noise figure, the coil may be relatively short and use a fiber having a relatively small core and a high numerical aperture. The output of this stage is coupled into a second stage which divides the optical signal energy and the remaining pump energy, sending the different wavelengths along a counter-propagating path through a second rare earth doped fiber coil. The second stage is typically a high gain stage and, unlike the first stage, the fiber of the second stage amplifier coil may be relatively long and use a fiber having a relatively large core and a relatively low numerical aperture.

The fiber of each of the co-propagating and counter-propagating fiber amplifiers is preferably doped with erbium ($Er^{3+}$). This provides an amplifier which functions well for boosting the energy of a signal having a wavelength of approximately 1550 nm using pumping energy in the wavelength range of 980 nm. Optical isolators are also used throughout the amplifier, to ensure unidirectional propagation of the optical signal at certain points in the signal path. In particular, isolators may be located between the optical signal input port and the coupler which couples the input signal with the pump energy, in the counter-propagating amplifier path, and in the output path of the amplifier. These isolators are preferably wavelength selective, passing the optical signal (i.e., the wavelength range of 1550 nm), and help prevent unwanted feedback of the optical signal.

In an alternative embodiment of the invention, the multiple stage amplifier provides amplification of a single-wavelength, single-polarization signal. The initial optical signal is developed within a master oscillator having an output coupler formed by a chirped Bragg grating fabricated in a polarization maintaining fiber. The gain fiber of the oscillator is rare earth doped, preferably with erbium/ytterbium (Er/Yb), and it is pumped with optical energy of an appropriate wavelength. For pumping an Er/Yb resonator, a narrow channel WDM coupler is used to combine energy from plurality of pump laser sources all having different wavelengths in the range of 980 nm. A highly reflective grating at the front end of the resonator, along with the aforementioned chirped grating in the polarization maintaining fiber at the output side of the resonator, combine to provide the resonator cavity necessary for producing a single-frequency, single-polarization output.

The output of the master oscillator passes through a co-propagating fiber amplifier and through a counter-propagating fiber amplifier, each of which is preferably erbium doped. Much of the pumping energy which passes through the resonator is used to amplify the optical signal within the two fiber amplifier stages. In order to control the polarization of the optical output in this embodiment, the output of the counter-propagating fiber amplifier stage (typically the output stage) is input to a polarization controller, which passes only a single polarization of the optical signal. This polarization controller is calibrated to account for any polarization shifts which the optical signal undergoes during its propagation through non-polarization maintaining components.

DETAILED DESCRIPTION OF THE PREFERRED EMBODIMENTS

Figure 1A:
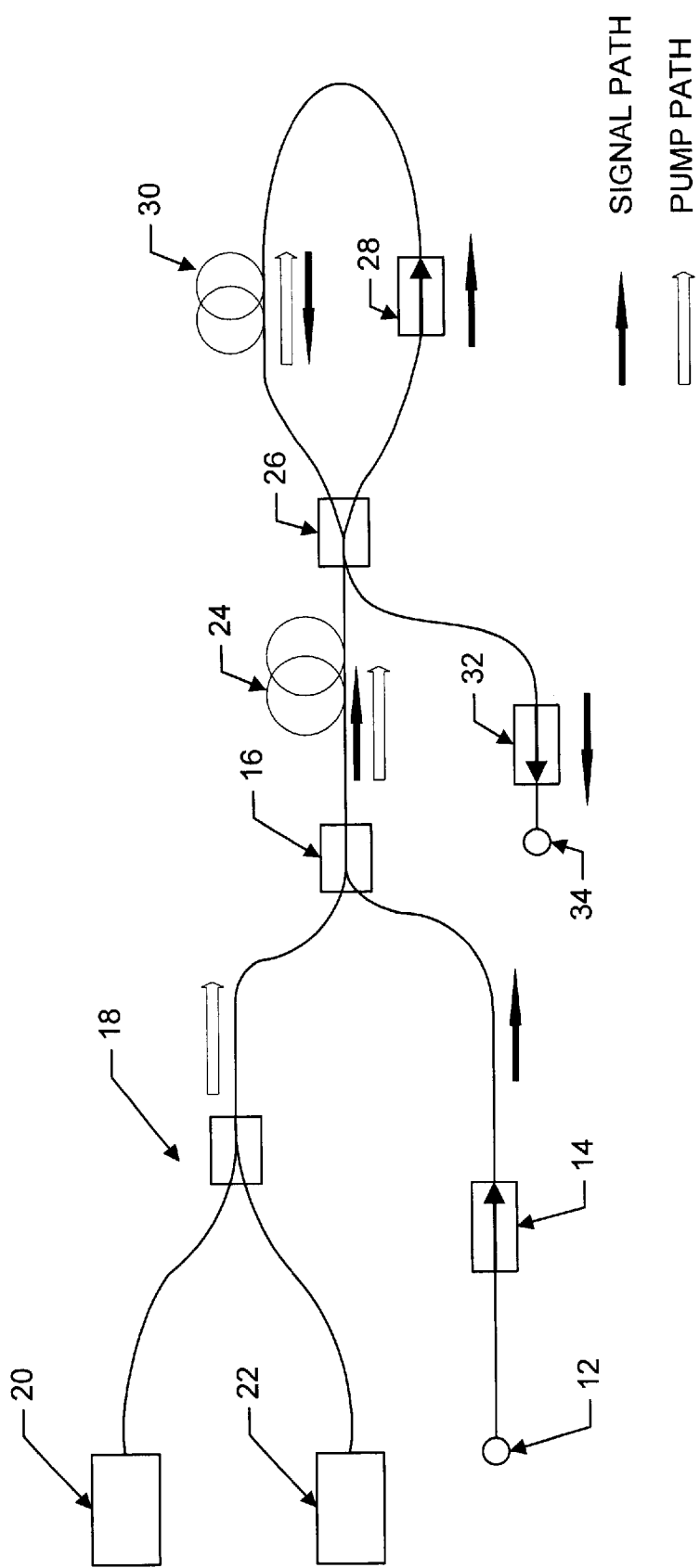
FIG. 1A is a schematic view of a two-stage optical amplifier in which two or more 980 nm lasers are used to co-pump the first stage, and where residual pump power is recycled for use in counter-pumping the second stage.

Shown in FIG. 1A is an amplifier according to the present invention in which an input signal port 12 of the amplifier receives an optical signal that is directed to an optical isolator 14. The optical isolator is a conventional optical element that allows unidirectional passage of a desired optical signal. Preferably, isolator 14 is wavelength selective, passing wavelengths in the range of the wavelength of the input optical signal. From isolator 14, the optical signal is input to wavelength division multiplexer (WDM) 16. It is preferred that the optical signal has a wavelength of approximately 1550 nm, which is within the peak transmission range of conventional silica-based optical fiber. This signal may be amplified using fiber amplifiers doped with a rare earth element such as erbium ($Er^{3+}$), that are pumped with pumping energies in the wavelength range of 980 nm. It will be understood by those skilled in the art that the invention may be modified to accommodate other wavelengths as well.

Also feeding WDM 16 is narrow channel WDM 18, which couples together laser energy from pumping sources 20, 22. Source 20 and source 22 each have a different wavelength, but both are in the vicinity of 980 nm. For example, source 20 may have a wavelength of 976 nm, while source 22 has a wavelength of 983 nm. The narrow channel WDM coupler 18 enables the energy from the two individual sources to be effectively combined, producing a pumping output from coupler 18 in the 980 nm range which is higher in power than either source could provide by itself.

The pumping energy and the optical signal are output together from WDM 16 and coupled into erbium ($Er^{3+}$) doped fiber coil 24. Within fiber coil 24, energy is transferred from the pump wavelengths to the optical signal wavelengths. This amplifies the 1550 nm signal, while decreasing the 980 nm pump energy. The coil 24 is the heart of a first-stage amplifier that uses optical fiber with a relatively small core and a relatively high numerical aperture in order to keep the noise figure of the amplifier comparatively low. Preferably, the amplifier is pumped with a high power output from WDM 18 (e.g. in the range of 400 mW). In the figures, the path of the signal is designated by solid arrows, while the path of the pump energy is designated by outlined arrows The output of amplifier coil 24 is fed into WDM 26, which is used to separate the 1550 nm optical signal energy from the residual pumping energy in the 980 nm wavelength range. The signal energy and the pumping energy are then counter-propagated through a second stage amplifier consisting of $Er^{3+}$ doped fiber coil 30. As shown, the optical signal travels a first direction through isolator 28 and on to fiber coil 30 (counterclockwise relative to the orientation of the second stage in FIG. 1A), while the pumping energy passes the opposite direction through coil 30. Within coil 30, additional amplication of the 1550 nm optical signal results from further absorption of the 980 nm pump energy. Thus, the optical signal returning to coupler 26 from coil 30 is further amplified by the second stage of the amplifier. The amplified optical signal passes from WDM 26 to isolator 32, which prevents any feedback of optical signal energy from output port 34 back to the amplifier stages. The amplified optical signal is then coupled to output port 34, from which it may then be used for any desired purpose.

It is preferred that the second amplifier stage (i.e., that using fiber coil 30) is primarily a high gain stage while the first stage is a low noise stage. As mentioned above, an optical fiber with a relatively small core and a relatively high numerical aperture is preferred for fiber coil 24 of the first stage to help minimize the noise figure. However, a fiber with a relatively large core and a relatively low numerical aperture is used for the coil 30 of the second amplifier stage. The features of the fiber of coil 30 result in better absorption from the pump energy and, correspondingly, a higher amplifier gain. In one embodiment, coil 30 is an $Er^{3+}$ doped fiber like that used in the first stage. However, alternatively, an erbium/ytterbium (Er/Yb) doped fiber could also be used for the second stage to widen the wavelength absorption band. This is particularly beneficial when more than two input pumping sources are combined to provide the pump energy.

Figure 1B:
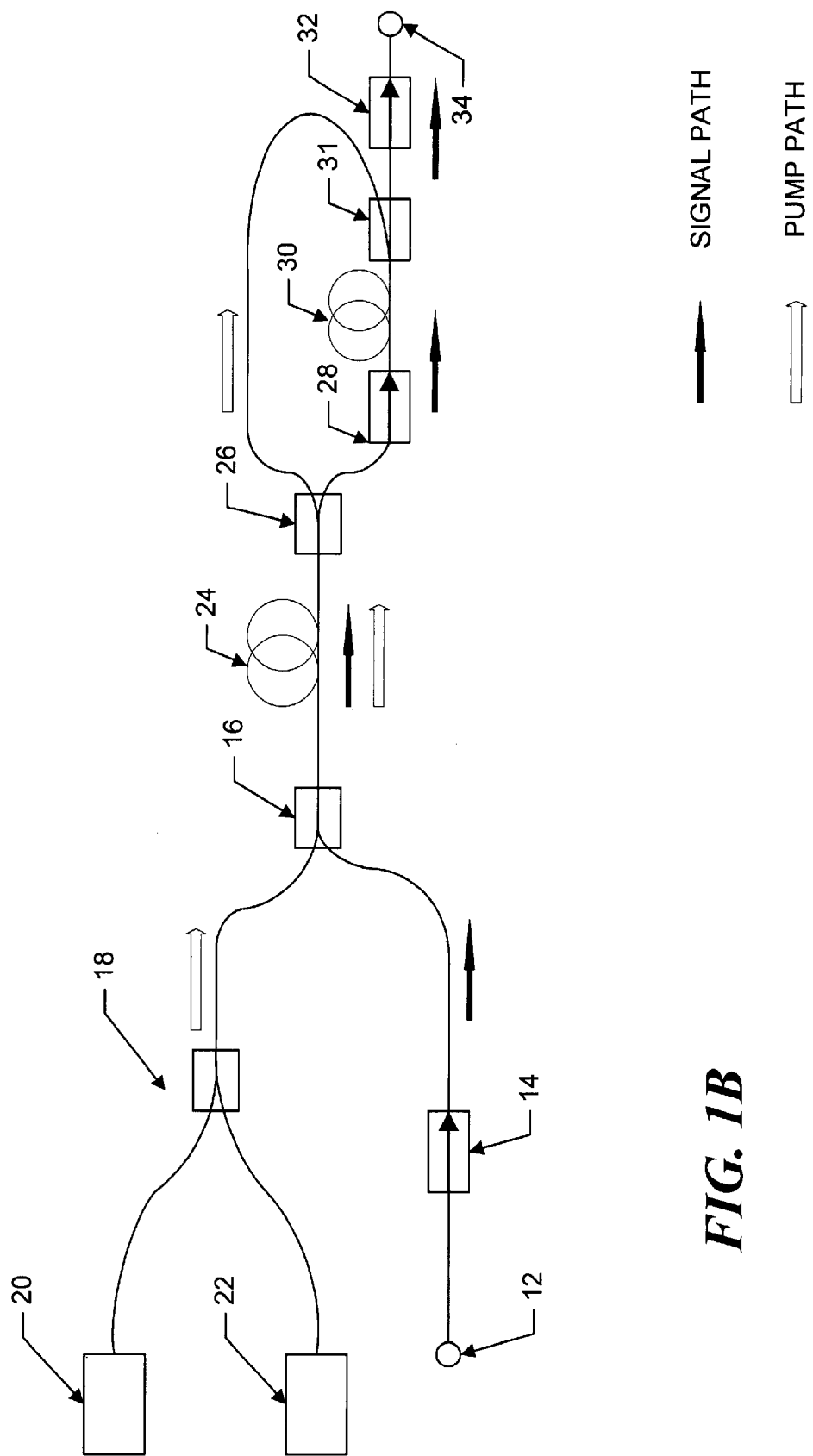
FIG. 1B is a variation of the FIG. 1A embodiment, in which a second optical coupler is used to couple out the desired signal energy from the second stage.

Shown in FIG. 1B is a variation of the embodiment of FIG. 1 in which the second amplification stage is modified. As in the embodiment of FIG. 1A, the signal from the first stage is directed into WDM 26 along with the pump energy remaining after amplification in the first stage. WDM 26 separates the signal energy and the pump energy, directing the pump energy along a first path toward WDM 31, while the signal energy is directed to optical isolator 28. Upon passing through isolator 28, the signal is coupled into fiber coil 30, which is the same as described above with regard to FIG. 1A. The pump energy is also directed into fiber coil 30 via WDM 31, counterpropagating through the coil relative to the signal energy. As the pump energy is absorbed by the coil fiber, further amplification of the signal occurs through stimulated emission. This amplification is essentially the same as described with regard to the embodiment of FIG. 1A. However, rather than directing the signal energy exiting the coil back to WDM 26, it exits the second amplification stage via WDM 31, passing through optical isolator 32 to output port 34, where it may be used for any desired purpose.

The embodiment of FIG. 1B requires one more optical coupler than that of FIG. 1A. However, an advantage may be gained in that the optical signal is not directed back toward the WDM 26. In FIG. 1A, while nearly all of the signal energy exiting the second amplification stage is directed by WDM 26 to optical isolator 32, a small fraction of signal energy can leak back into the first amplification stage. This adds a small amount of noise to the signal exiting the first stage, reducing the overall signal-to-noise ratio of the system. However, in the embodiment of FIG. 1B, the optical signal exits the second amplification stage via WDM 31. Any small leakage of the signal through WDM 31 back to WDM 26 is small enough that subsequent leakage through WDM 26 is negligible.

Figure 2A:
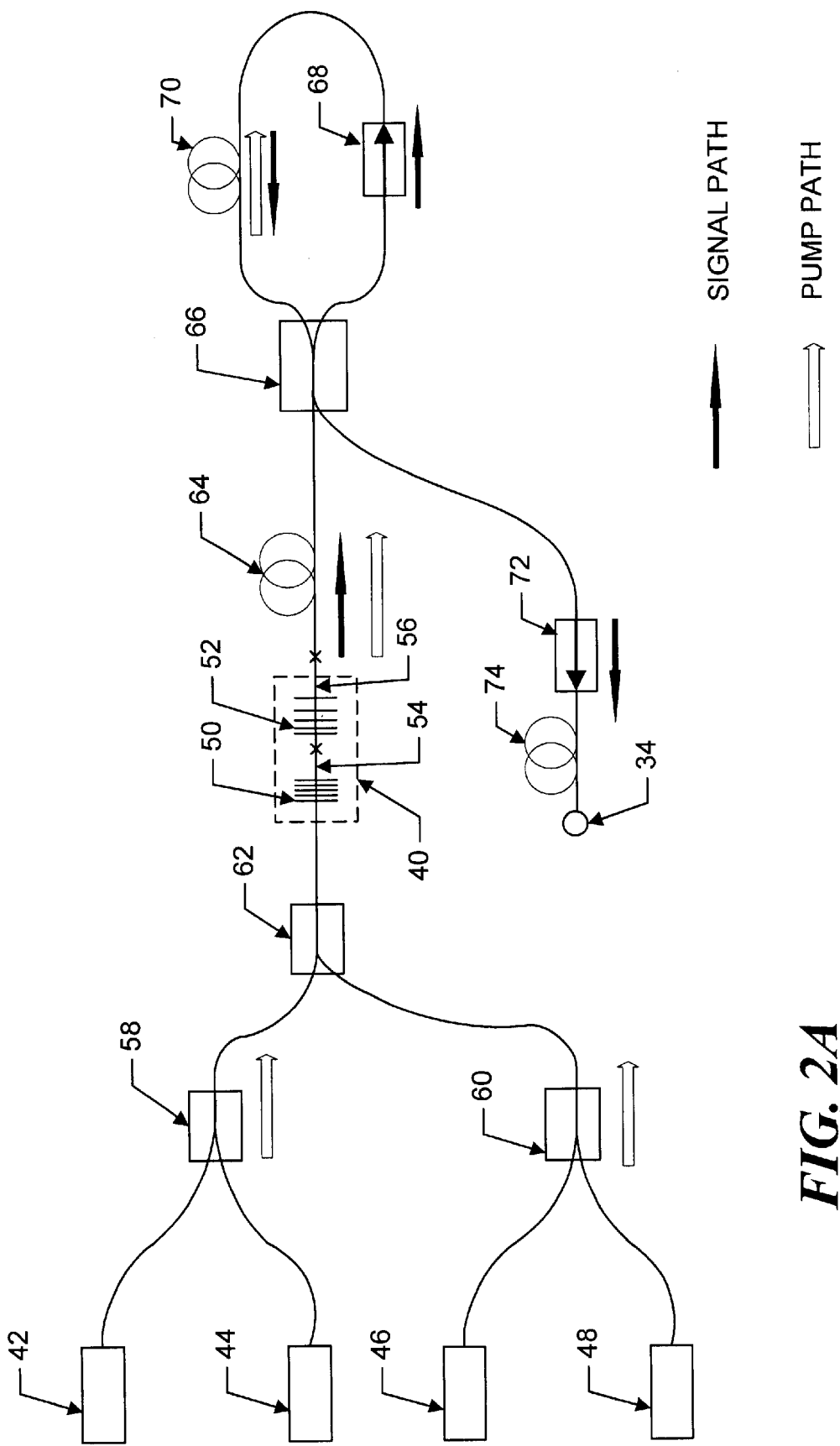
FIG. 2A is a schematic view of an alternative embodiment of the invention which provides a single-frequency, single polarization output.

Shown in FIG. 2A is an alternative embodiment of the present invention that incorporates the amplifier with a master oscillator to form an optical signal source. In particular, this embodiment is directed to the generation of a single-frequency, single-polarization output. A master oscillator 40 is pumped by energy combined from laser sources 42, 44, 46 and 48. Each of these sources is close in wavelength to a desired pumping wavelength. For example, for a 980 nm pumping wavelength, sources 42, 44, 46 and 48 might have wavelengths of 970 nm, 975 nm, 980 nm and 985 nm, respectively.

In this embodiment, it is preferred that the master oscillator is a low-noise, single-mode, single-polarization master oscillator. Preferably, the oscillator 40 is a distributed Bragg reflector (DBR) oscillator having a cavity length of approximately 2.5–5.0 cm. The oscillator consists of a highly reflective Bragg grating 50 at the front end, and a highly birefringent Bragg grating 52 used as an output coupler at the output side of the oscillator 40. Each of the gratings 50, 52 is integrated into the fiber of the oscillator 40 in a known manner.

The fiber of the master oscillator 40 preferably includes an Er/Yb doped fiber. The entire fiber within the oscillator 40 may be doped, polarization maintaining fiber, with the Bragg gratings 50, 52 integrated directly into the fiber. However, because of the difficulties in obtaining doped polarization maintaining fiber, the embodiment of FIG. 2A shows the fiber in two segments. A first Er/Yb doped, non-polarization maintaining fiber 54 has integrated within it highly reflective grating 50. To this fiber segment is coupled, e.g. by splicing, polarization maintaining fiber segment 56 within which is integrated chirped grating 52. Each of the fiber segments provides a desired characteristic of the first amplifier stage. The doping in fiber segment 54 provides amplification for the oscillator 40, while the segment 56 provides a single-frequency, single-polarization output.

The 980 nm range sources 42, 44, 46 and 48 are coupled via WDM couplers 58, 60 and 62. The pump sources may be, e.g., approximately 125 mW each, making the input power to the master oscillator 40 approximately 450 mW (taking into account WDM losses). Because of the relatively short cavity length of the oscillator 40, only a small percentage of the pump energy is absorbed by the oscillator 40. Thus, a large portion of the pump energy exits the oscillator with the optical signal. As in the FIG. 1A embodiment, the optical signal preferably has a wavelength of approximately 1550 nm. With the parameters provided above, the power in the 1550 nm signal at the output of the oscillator 40 will be approximately 1 to 10 mW.

In the first amplifier stage of the signal source of FIG. 2A, the output of the master oscillator 40 is input to a fiber amplifier which includes doped fiber loop 64. In this stage, a significantly higher amount of pump energy is transferred to the 1550 nm signal within the fiber coil 64. This co-propagating arrangement has the pump energy and the optical signal traveling the same direction through the fiber coil 64. As more energy is transferred from the 980 nm range wavelengths to the 1550 nm signal wavelength, more amplification of the desired optical signal results. The output of the co-propagating stage is input to a counter-propagating fiber amplifier including WDM 66, isolator 68 and doped fiber coil 70.

As in the embodiments of FIGS. 1A and 1B, the fiber coils 64, 70 may be doped with either erbium or erbium/ytterbium. Again, the first stage is preferably a low-noise stage, so the coil 64 uses optical fiber which has a relatively small core, and a relatively high numerical aperture. The coil 70, however, uses an optical fiber with a relatively large core and a relatively low numerical aperture. The residual pump energy exiting coil 64 (having a wavelength of approximately 980 nm) is separated from the signal energy (which has a wavelength of approximately 1550 nm) by WDM 66. The 1550 nm signal travels through isolator 68 and on through fiber coil 70. Meanwhile, pump energy at 980 nm follows a second path which couples it into fiber coil 70 in a direction opposite to the propagation direction of the 1550 nm optical signal. Within fiber coil 70, most of the remaining pump energy is absorbed and transferred to the 1550 nm wavelength signal.

The further amplified optical signal from the counter-propagating amplifier stage is coupled by WDM 66 to isolator 72. Isolator 72 prevents feedback of the 1550 nm signal into the amplifier stages. The signal also passes through polarization controller 74, which is a polarization-selective component that passes a single polarization of light. Such devices are known in the art and may comprise, for example, a segment of polarization maintaining fiber twisted so as to accept light at only the desired polarization. In this embodiment, the polarization controller is calibrated to accept only a single polarization (created in master oscillator 40) and to account for the rotation of the polarization which may have occurred during the signal propagation through the non-polarization maintaining components of the subsequent amplifier stages. This shift may be determined through measurement of the output signal in a known manner.

Figure 2B:
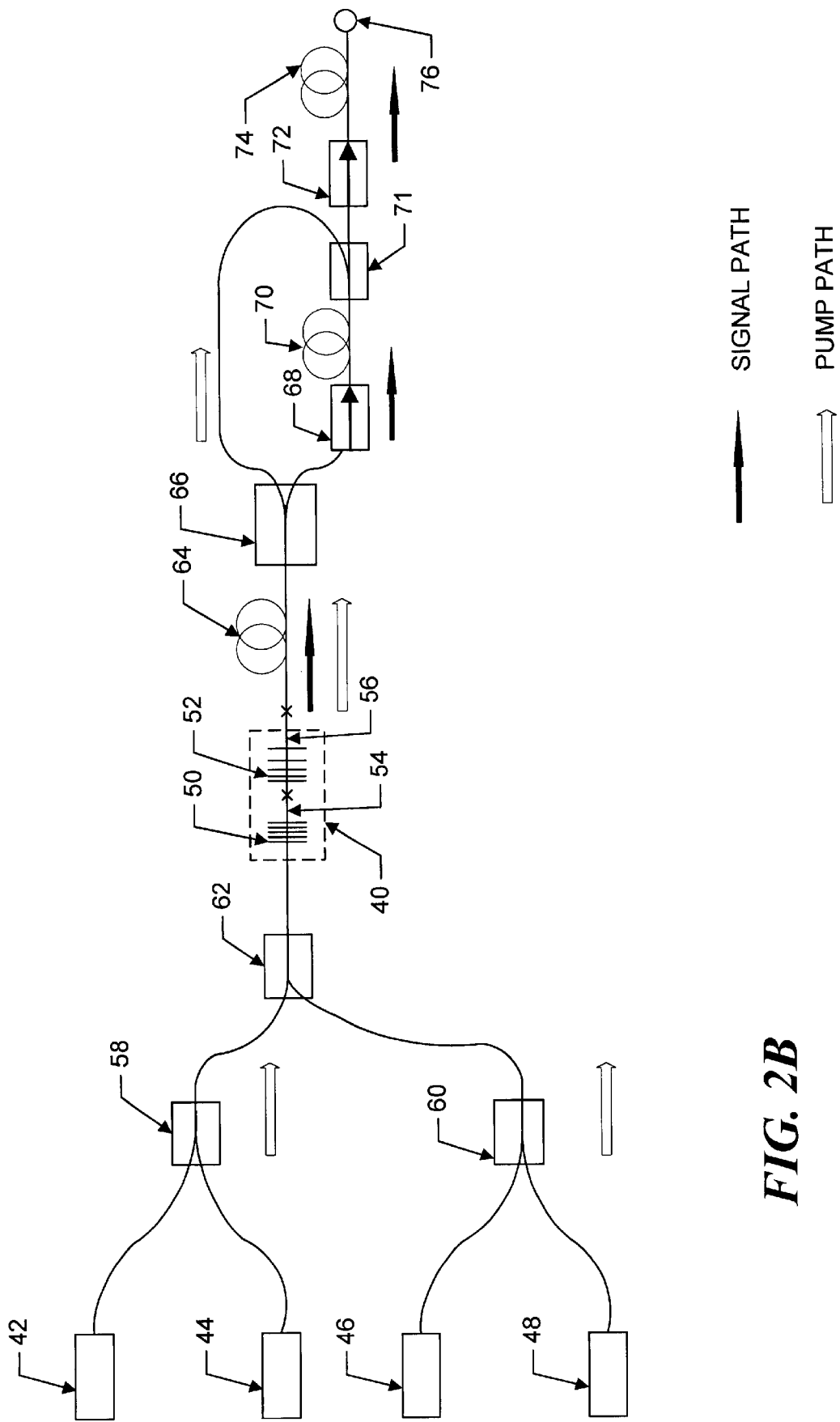
FIG. 2B is a variation of the FIG. 2A embodiment, in which a second optical coupler is used to couple out the desired signal energy from the second stage.

FIG. 2B shows a variation of the FIG. 2A embodiment, in which the second amplification stage differs from that of the FIG. 2A embodiment in essentially the same way that the second amplification stage of the FIG. 1B embodiment differs from that of FIG. 1A. That is, the optical signal energy, rather than being coupled out of the second stage with the same WDM (WDM 66) through which it is coupled into the stage, is directed out through a second WDM, that being WDM 71. Operation of the signal generator of FIG. 2B is identical to that of FIG. 2A up to WDM 66. In FIG. 2B, WDM 66 separates the optical signal energy and the pump energy, directing them along different paths. The pump energy travels right to WDM 71, while the signal energy first encounters optical isolator 68. Once passing through isolator 68, the signal travels through second stage optical fiber coil 70, where it counterpropagates with pump energy received from WDM 71. The coil 70 may be identical to the second stage coil of the FIG. 2A embodiment, and the pump energy is absorbed by the fiber while it travels through the coil. The optical signal is amplified through stimulated emission within the fiber coil 70, and the amplified signal exits the coil and is directed to WDM 71.

The optical signal energy exits the second amplification stage via WDM 71, and is directed to optical isolator 72. As with the FIG. 2A embodiment, the signal from isolator 72 passes through polarization controller 74 before reaching output port 76, where it may be used for any desired purpose. The embodiment of FIG. 2B requires one more optical coupler than that of FIG. 2A, which makes it more costly. However, as described above with regard to FIG. 1B, an advantage is gained in preventing leakage of the optical signal back into the first amplification stage by its direction back to WDM 66.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An optical amplifier comprising:
 a first amplifier stage comprising an optical fiber into which an optical signal and optical pump energy are coupled; and
 a second amplifier stage comprising an optical fiber into which the optical signal from the first amplifier stage is coupled, wherein the fiber of the second stage has a core diameter significantly larger than a core diameter of the fiber of the first stage.

2. An optical amplifier according to claim 1 wherein the optical signal propagates through the first stage prior to propagating through the second stage.

3. An optical amplifier according to claim 1 wherein the optical signal propagates through the second stage prior to propagating through the first stage.

4. An optical amplifier according to claim 1 wherein the pump energy propagates in the first stage in the same direction as the optical signal.

5. An optical amplifier according to claim 1 wherein the pump energy propagates in the second stage in the same direction as the optical signal.

6. An optical amplifier according to claim 1 wherein the pump energy propagates in the second stage in the opposite direction as the optical signal.

7. An optical amplifier according to claim 1 wherein unabsorbed pump energy from one of the stages is coupled into the other stage.

8. An optical amplifier according to claim 1 wherein a numerical aperture of the second stage amplifier stage is lower than a numerical aperture of the first amplifier stage.

9. An optical amplifier according to claim 1 further comprising a source of pump energy wherein the pump energy source comprises multiple optical sources.

10. An optical amplifier according to claim 9 wherein the output of the optical sources is combined with an optical coupler.

11. An optical amplifier according to claim 1 further comprising a wavelength division multiplexer that separates the optical signal and the pump energy prior to its entering the second amplifier stage.

12. An optical amplifier according to claim 11 wherein the wavelength division multiplexer is a first wavelength division multiplexer, and wherein the amplifier further comprises a second wavelength division multiplexer through which the optical signal is coupled out of the second amplification stage.

13. An optical amplifier according to claim 1 further comprising an optical isolator through which the optical signal passes in the second amplifier stage.

14. An optical amplifier according to claim 1 wherein the optical fiber of the second amplifier stage is a rare earth doped fiber.

15. An optical amplifier according to claim 14 wherein the doped optical fiber of the second stage comprises erbium/ytterbium.

16. An optical amplifier according to claim 15 wherein the optical fiber of the first stage is doped with erbium.

17. An optical amplifier according to claim 1 further comprising a first wavelength division multiplexer which separates the optical signal and the pump energy prior to their being coupled into the optical fiber of the second amplifier stage, and a second wavelength division multiplexer through which the optical signal is coupled out of the second amplification stage.

18. An optical amplifier comprising:
 a first amplifier stage comprising an optical fiber into which an optical signal and optical pump energy are coupled; and
 a second amplifier stage comprising an optical fiber into which the optical signal from the first amplifier stage is coupled, wherein the fiber of the second stage has a numerical aperture significantly lower than the numerical aperture of the fiber of the first stage.

19. An optical amplifier according to claim 18 wherein the optical signal propagates through the first stage prior to propagating through the second stage.

20. An optical amplifier according to claim 18 wherein the optical signal propagates through the second stage prior to propagating through the first stage.

21. An optical amplifier according to claim 18 wherein the pump energy propagates in the first stage in the same direction as the optical signal.

22. An optical amplifier according to claim 18 wherein the pump energy propagates in the second stage in the same direction as the optical signal.

23. An optical amplifier according to claim 18 wherein the pump energy propagates in the second stage in the opposite direction as the optical signal.

24. An optical amplifier according to claim 18 wherein unabsorbed pump energy from one of the stages is coupled into the other stage.

25. An optical amplifier according to claim 18 further comprising a source of pump energy wherein the pump energy source comprises multiple optical sources.

26. An optical amplifier according to claim 25 wherein the output of the optical sources is combined with an optical coupler.

27. An optical amplifier according to claim 18 further comprising a wavelength division multiplexer that separates the optical signal and the pump energy prior to its entering the second amplifier stage.

28. An optical amplifier according to claim 27 wherein the wavelength division multiplexer is a first wavelength division multiplexer, and wherein the amplifier further comprises a second wavelength division multiplexer through which the optical signal is coupled out of the second amplification stage.

29. An optical amplifier according to claim 18 further comprising an optical isolator through which the optical signal passes in the second amplifier stage.

30. An optical amplifier according to claim 18 wherein the optical fiber of the second amplifier stage is a rare earth doped fiber.

31. An optical amplifier according to claim 30 wherein the doped optical fiber of the second stage comprises erbium/ytterbium.

32. An optical amplifier according to claim 31 wherein the optical fiber of the first stage is doped with erbium.

33. An optical amplifier according to claim 18 further comprising a first wavelength division multiplexer which separates the optical signal and the pump energy prior to their being coupled into the optical fiber of the second amplifier stage, and a second wavelength division multiplexer through which the optical signal is coupled out of the second amplification stage.

34. An optical amplifier comprising:
 a first amplifier stage comprising an optical fiber into which an optical signal and pump energy are coupled; and
 a second amplifier stage comprising an optical fiber into which the optical signal and the unabsorbed pump energy from the first amplifier stage are coupled via a wavelength selective optical coupler, and from which an amplified version of the optical signal is output via said wavelength selective coupler.

35. An optical amplifier according to claim 34 wherein the wavelength selective optical coupler separates the optical signal from the unabsorbed pump energy.

36. An optical amplifier according to claim 35 wherein the wavelength selective coupler directs the optical signal and the unabsorbed pump energy in opposite propagation directions through the optical fiber of the second optical stage.

37. An optical amplifier comprising:

a plurality of coupled amplifier stages each comprising an optical fiber gain medium for amplifying an optical signal, wherein the optical fiber of one of the amplifier stages has a larger core than the fiber of the other stage; and a plurality of pump sources coupled together to provide energy to the amplifier stages.

38. An optical amplifier according to claim 37 wherein the pump energy co-propagates with the optical signal through one of the amplifier stages, and counter-propagates through another one of the amplifier stages with the optical signal.

39. An optical amplifier according to claim 37 further comprising a wavelength selective coupler that separates the optical signal and the pump energy traveling in a common optical prior to their being coupled into the amplifier stage through which the signal and the pump energy counter-propagate.

40. An optical amplifier according to claim 39 wherein the wavelength selective coupler couples the optical signal out of the amplifier stage through which the signal and the pump energy counter-propagate.

41. An optical amplifier according to claim 37 wherein one of the amplifier stages comprises a co-doped optical fiber amplifier.

42. An optical amplifier according to claim 41 wherein dopants of the co-doped optical fiber comprise erbium and ytterbium.

43. An optical amplifier according to claim 37 wherein at least a portion of the pump energy propagates through a first of the amplifier stages without being absorbed therein, and is coupled into a second one of the amplifier stages.

44. An optical amplifier according to claim 37 wherein the pump sources are coupled together with a wavelength division multiplexer (WDM).

* * * * *

UNITED STATES PATENT AND TRADEMARK OFFICE
CERTIFICATE OF CORRECTION

PATENT NO.      : 6,297,903 B1
DATED           : October 2, 2001
INVENTOR(S)     : Stephen G. Grubb and Bernard G. Fidric It is certified that error appears in the above-identified patent and that said Letters Patent is hereby corrected as shown below:

<u>Title page,</u>
Item [22], please insert:
-- Related U.S. Application Data
[63] Continuation of Ser. No. 08/914,713, August 19, 1997, Pat. No. 6,008,933. --

<u>Column 1,</u>
Line 8, please insert:
-- CROSS REFERENCE TO RELATED APPLICATIONS
This is a continuation of Ser. No. 08/914,713, August 19, 1997, Pat. No. 6,008,933. --

Signed and Sealed this

Fourteenth Day of May, 2002

*Attest:*

*Attesting Officer*

JAMES E. ROGAN
*Director of the United States Patent and Trademark Office*